Nov. 19, 1940.  E. LIPSON  2,222,149

METHOD AND APPARATUS FOR LOGGING WELLS

Filed Nov. 28, 1939

EDWARD LIPSON
INVENTOR.

BY Jesse R Stone
Lester B Clark
ATTORNEYS.

Patented Nov. 19, 1940

2,222,149

UNITED STATES PATENT OFFICE 2,222,149

METHOD AND APPARATUS FOR LOGGING WELLS

Edward Lipson, Houston, Tex., assignor to Casolog Inc., a corporation of Texas

Application November 28, 1939, Serial No. 306,471

8 Claims. (Cl. 175—182)

This invention relates to means and method for logging well bores and is of particular utility in the logging of bores within which casing has been set.

In wells which produce oil and gas it is desirable to obtain information as to the nature of the penetrated formations. Such information may be obtained during the process of drilling or it may be obtained after a well has been completed and production is exhausted when it is found desirable to effect production at a new or different level. Various methods have been devised for electrically logging newly drilled wells but difficulties have been encountered and the efficacy of results depends to a large extent upon the interpretation of graphical information obtained as indicative of the variations in resistivity, porosity and/or other electrical characteristics of the formations penetrated by the well bore.

In the logging of cased bore holes additional difficulties have been encountered due to the presence of the electrically conductive casing within the bore hole. The present invention is designed to obviate existing difficulties in the logging of well bores and has for its primary object the provision of means and method for successfully logging well bores whether such bores be cased or uncased.

Another object of the invention is to provide a conductive connection between a movable electrode within a well bore and a grounded electrode in spaced relation with the bore to investigate the variations in potential between a point in the area of current conduction and a point in the conductive connection.

Another object of the invention is to provide an electrical method and apparatus for logging well bores by providing a significant record of the varying conditions of the formations transversed by an electrode which is moved within the well bore.

Still another object is to provide means and method wherein an electric current passes thru the earth between a movable electrode within the well bore and an electrode grounded in the earth at a point in spaced relation with the mouth of the well bore, means being provided for measuring the variations in electrical conditions in a circuit carrying a portion of said current and connected to another electrode grounded in the earth in spaced relation with the mouth of the well bore and the first grounded electrode.

It is also an object of the invention to provide method and apparatus for passing a variable electric current thru the earth to an electrode within a cased or uncased bore hole, measurements being made of the variations in electrical conditions as the electrode is moved within the bore hole.

A still further object is to provide method and apparatus for logging wells by the utilization of means for passing an electric current thru the earth from a grounded electrode to an electrode movable within the bore hole, an additional grounded electrode being provided to determine the significant fluctuations in the electrical characteristics of subterranean formations as the position of the movable electrode is changed.

The foregoing objects together with other objects will be apparent from the following description taken in connection with the drawing in which.

Figure 1:
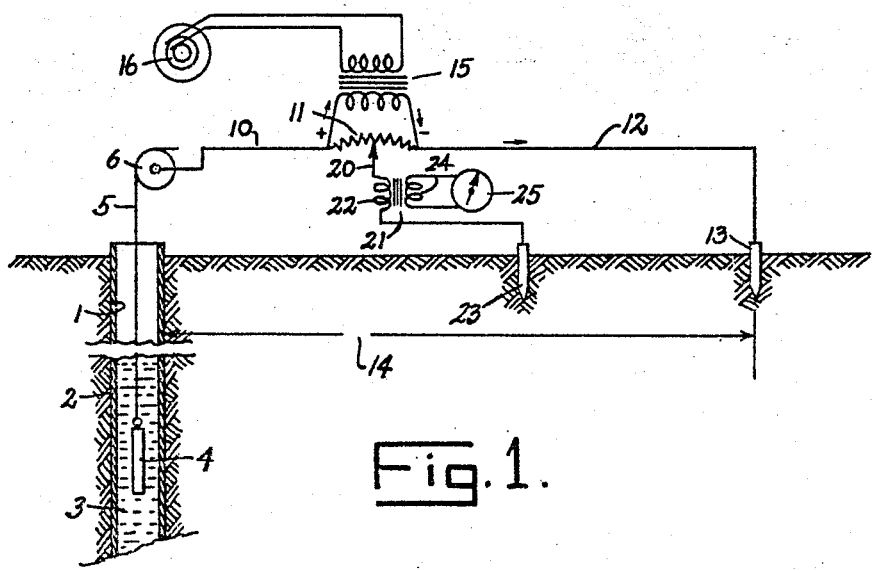
Fig. 1 is a vertical sectional view thru a bore hole in the earth, the circuit arrangements and electrodes being shown schematically to illustrate the nature and mode of the operation of the invention.

Referring to Fig. 1 the bore hole 1 is shown as provided with a casing 2 and containing a conducting liquid 3 in which is immersed an electrode 4. Since the invention is of particular utility in the logging of cased bore holes, the illustrated embodiment is shown in connection with the logging of a bore hole within which the casing 2 is placed. It is to be understood, however, that the invention is not confined to the illustrated construction but is of utility whether or not the bore hole to be logged is provided with a casing.

An insulated conductor 5 is attached to the electrode 4 and extends upwardly to the mouth of the well bore where it passes upon a pulley or reeling drum 6. Suitable mechanism (not shown) well known in the art is provided for winding or unwinding the conductor cable 5 so that a desirable traverse of the bore hole 1 by the electrode 4 is effected.

Figure 2:
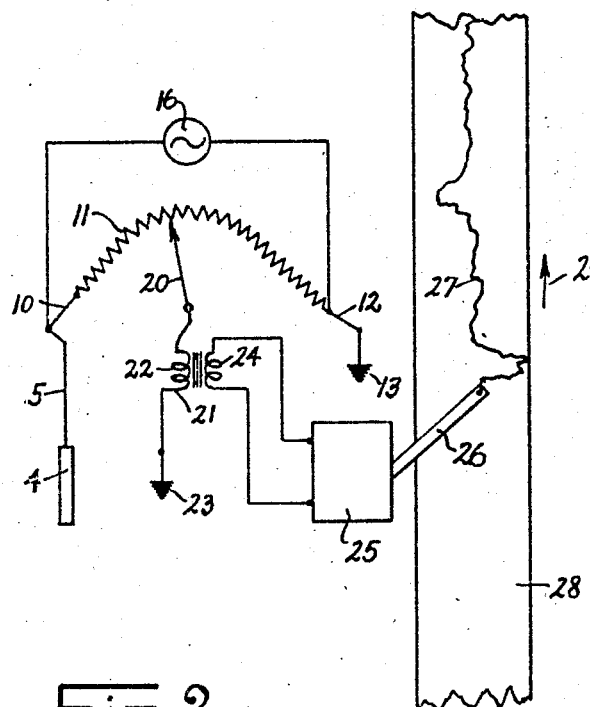
Fig. 2 is a schematic diagram of the electrical circuits involved and the manner of producing a graphical record as a bore hole is traversed.

An electrical connection is constantly maintained between the conductor 5 and a conductor 10 of which the latter is connected to one terminal of an inductance or resistance generally designated as 11 and which is of the slide wire or tapped type for a purpose to be hereinafter described. The opposite end of the element 11 is connected by means of a conductor 12 to an electrode 13 grounded in the earth at a distance 14, from the bore hole. It is apparent from the foregoing description that an electrical circuit is completed thru the conductors 5, 10 and 12 and the element 11 between the electrodes 4 and 13, the remainder of the circuit being thru the earth between the electrodes 4 and 13. Electrical energy is introduced to the circuit just described as by means of a transformer 15 having its secondary terminals connected across the element 11 and its primary terminals connected to a source of electromotive force such as an alternator 16. An alternating current is desirable in the practice of the invention but it is to be understood that any suitable current, and particularly a variable current may be used and, if desired, a direct connection may be made between the source 16 and the points at which the current is introduced into the circuit which includes the electrodes 4 and 13, as illustrated in Fig. 2.

In order to obtain desired indications of variations in the electrical characteristics of formations traversed as the electrode 4 is moved within the bore hole 1, a sliding contact 20 on the element 11 is connected to an indicator generally referred to as 21 shown in the illustrated embodiment as comprising a transformer having the opposite terminals of its secondary winding 22 connected to the contactor 20 and a ground element 23 respectively. The ground electrode 23 is in spaced relation with each the mouth of the bore hole and the electrode 13. The secondary 24 of the transformer 21 is connected to an indicating or recording instrument 25 of any suitable type so that the fluctuations of the current through the primary 22 or the potential thereacross may be determined.

Either of two methods may be utilized for determining the variations in the characteristics of the formations traversed by the well bore as the electrode 4 is moved therein. For example the contactor 20 may be set at a desired point on the inductance or resistance 11 so that the instrument 25, preferably of the recording type, will produce the desired record as the electrode 4 is moved within the bore hole.

The former of these methods of obtaining the desired information and the operation of the invention may be further illustrated by reference to Fig. 2 where the contactor 20 is shown at a given position. In event the electrode 4 is moved within the bore hole, circuit conditions will be altered by variations of the earth formations traversed by the bore hole. Accordingly the current flowing thru the circuit including the contactor 20 and the primary of the transformer 21 will energize the recorder 25 which is provided with a recording arm 26 or other suitable recording instrumentality to trace the results graphically at 27 upon a recorder strip 28 moving in the direction of the arrow 29, and in correlation with the movement of the electrode 4 within the bore hole. It is to be understood that the complete record will include such tabulations or graphical record as necessary and correlatable with the record produced upon the recording strip 28 so that variations with depth of the electrode are indicated.

As regards the position of the electrodes 13 and 23 relative to each other and to the mouth of the bore hole it has been found that excellent results are obtainable in the logging of a well bore when these electrodes are spaced 300 feet and 150 feet respectively from the mouth of the bore hole. Again it is to be understood that such specific arrangement is illustrative only and it is intended that the invention shall not be confined thereto.

Broadly the invention comprehends novel method and apparatus for logging bore holes by the use of a varying electric current passing between a movable electrode within the well bore and a grounded electrode at a point in spaced relation with the mouth of the well bore, and observing the potential variations in the current conducting area as the movable electrode traverses the well bore.

What is claimed is:

1. A method of determining the nature of formations penetrated by a cased bore hole, comprising the steps of, moving an electrode within the bore hole, passing an electric current through the earth between said electrode and an electrode grounded at a point in spaced relation with the mouth of the bore hole, passing said current through a resistor connected to each of said electrodes, and measuring the variations in the potential between a point on the resistor and an electrode grounded at a point in spaced relation with the first mentioned electrode and the mouth of the bore hole.

2. A method of determining the nature of formations penetrated by a cased bore hole comprising the steps of moving an electrode within the bore hole, passing a varying electric current through the earth between said electrode and an electrode grounded at a point in spaced relation with the mouth of the bore hole, passing at least a portion of said current through an impedance connected to each of said electrodes, and measuring the variations in current flowing between a point on said impedance and an electrode grounded at a point between the mouth of the bore hole and said first grounded electrode during said electrode moving step.

3. A method of determining the nature of formations penetrated by a cased bore hole comprising the steps of lowering an electrode within the bore hole, passing a varying electric current through the earth between said electrode and an electrode grounded at a point in spaced relation with the mouth of the bore hole, the circuit for said current including an impedance connected to each of said electrodes, and measuring the variations in current flowing between a point on said impedance and an electrode grounded in spaced relation with each of said first mentioned electrodes.

4. A method of determining the nature of formations penetrated by a bore hole comprising the steps of passing a varying electric current between a point within the well bore and a point on the earth in spaced relation with the mouth of the well bore, maintaining said current between said points and through an impedance therebetween, varying the position of the first mentioned point within the well bore, and measuring the variations in potential between a point on said impedance and a second point in the eath in spaced relation with the mouth of the well bore.

5. A method of logging a cased bore hole comprising the steps of lowering within the bore hole an electrode, applying a varying potential across a resistor having its opposite ends connected to said electrode and a grounded electrode spaced from the mouth of the bore hole, and measuring the variations in potential between a point on said resistor and a grounded electrode in spaced relation with each the mouth of the well bore and said first mentioned grounded electrode.

6. A method of logging a cased bore hole comprising the steps of lowering an electrode within the bore hole, applying an alternating potential across a resistor having its opposite ends connected to said electrode and a grounded electrode spaced from the mouth of the bore hole, and measuring the variations in the potential between a point on the resistor and an electrode grounded at a point in spaced relation with the first mentioned electrode and the mouth of the bore hole.

7. Apparatus for logging well bores comprising in combination, a first electrode, means for lowering said electrode within a well bore in contact with conducting fluid therein, a second electrode grounded in the earth at a point in spaced relation with the mouth of the well bore, a resistor connected to said electrodes whereby an electric circuit is completed and includes the earth between the electrodes, a source of varying potential connected across said resistor, a third electrode grounded at a point in spaced relation to the mouth of the bore hole and said second electrode, a conductive connection between the third electrode and a point on said resistor and means for measuring the variations in current in said conductive connection as said first electrode is lowered within the well bore.

8. Apparatus for logging cased bore holes comprising in combination, an electric circuit for passing a variable electric current between a point on the earth and a movable electrode within a bore hole, said circuit including a resistor, and separate means for measuring the variations in electric current between a point on the resistor and a different point on the earth as the position of the movable electrode within the bore hole is varied.

EDWARD LIPSON.